United States Patent
Hofmann et al.

(10) Patent No.: US 10,821,545 B2
(45) Date of Patent: Nov. 3, 2020

(54) APPARATUS FOR MANUFACTURING THREE-DIMENSIONAL OBJECTS

(71) Applicant: CL SCHUTZRECHTSVERWALTUNGS GMBH, Lichtenfels (DE)

(72) Inventors: Alexander Hofmann, Weismain (DE); Jens Stammberger, Rödental (DE)

(73) Assignee: CONCEPT LASER GMBH, Lichtenfels (DE)

( * ) Notice: Subject to any disclaimer, the term of this patent is extended or adjusted under 35 U.S.C. 154(b) by 203 days.

(21) Appl. No.: 15/981,891

(22) Filed: May 16, 2018

(65) Prior Publication Data

US 2019/0022790 A1 Jan. 24, 2019

(30) Foreign Application Priority Data

Jul. 21, 2017 (EP) .................................... 17182637

(51) Int. Cl.
*B23K 26/03* (2006.01)
*B29C 64/386* (2017.01)
(Continued)

(52) U.S. Cl.
CPC .......... *B23K 26/032* (2013.01); *B22F 3/1055* (2013.01); *B29C 64/153* (2017.08);
(Continued)

(58) Field of Classification Search
CPC ............ B22F 3/1055; B22F 2003/1056; B22F 2003/1057; B22F 2003/1058; B22F 2003/1059; B23K 26/032; B29C 64/393; B29C 64/386; B29C 64/264; B29C 64/245; B29C 64/232; B29C 64/236; B33Y 50/02; B33Y 50/00; B33Y 30/00
See application file for complete search history.

(56) References Cited

U.S. PATENT DOCUMENTS 6,305,769 B1 * 10/2001 Thayer .................. B33Y 40/00
347/1
6,554,600 B1 * 4/2003 Hofmann ................ B29C 41/34
425/174.4

(Continued)

FOREIGN PATENT DOCUMENTS

CN 105792978 A 7/2016
FR 2774931 A1 8/1999
(Continued)

OTHER PUBLICATIONS

European Patent Search Report Corresponding to Application No. 17182637.3 dated Dec. 21, 2017.
(Continued)

*Primary Examiner* — Philip C Tucker
*Assistant Examiner* — Jimmy R Smith, Jr.
(74) *Attorney, Agent, or Firm* — Dority & Manning, P.A.

(57) ABSTRACT

Apparatus (1) for additively manufacturing of three-dimensional objects (2) by means of successive layerwise selective irradiation and consolidation of layers of a build material (3) which can be consolidated by means of an energy beam, wherein a direct measuring unit (4) is provided for determining a position and/or a travel distance of at least one moveable component (5) of the apparatus (1).

17 Claims, 3 Drawing Sheets

(51) Int. Cl.
*B29C 64/245* (2017.01)
*B33Y 50/00* (2015.01)
*B29C 64/153* (2017.01)
*B22F 3/105* (2006.01)
*C04B 35/64* (2006.01)
*B33Y 30/00* (2015.01)
*B29C 64/393* (2017.01)
*B33Y 50/02* (2015.01)
*B29C 64/20* (2017.01)
*B29C 64/264* (2017.01)

(52) U.S. Cl.
CPC ............ *B29C 64/20* (2017.08); *B29C 64/245* (2017.08); *B29C 64/264* (2017.08); *B29C 64/386* (2017.08); *B29C 64/393* (2017.08); *B33Y 50/00* (2014.12); *B33Y 50/02* (2014.12); *C04B 35/64* (2013.01); *B22F 2003/1056* (2013.01); *B22F 2003/1057* (2013.01); *B22F 2003/1058* (2013.01); *B33Y 30/00* (2014.12)

(56) References Cited

U.S. PATENT DOCUMENTS

| | | | |
|---|---|---|---|
| 10,525,550 | B2 | 1/2020 | Hildebrand et al. |
| 2015/0246414 | A1* | 9/2015 | Hess ................... B29C 64/153 219/76.14 |
| 2016/0175935 | A1 | 6/2016 | Ladewig et al. |

FOREIGN PATENT DOCUMENTS

| WO | WO2015/194398 A1 | 12/2015 |
|---|---|---|
| WO | WO2016/059844 A1 | 4/2016 |

OTHER PUBLICATIONS

Chinese Search Report Corresponding to Application No. 2017110903179 dated Mar. 25, 2020.

* cited by examiner

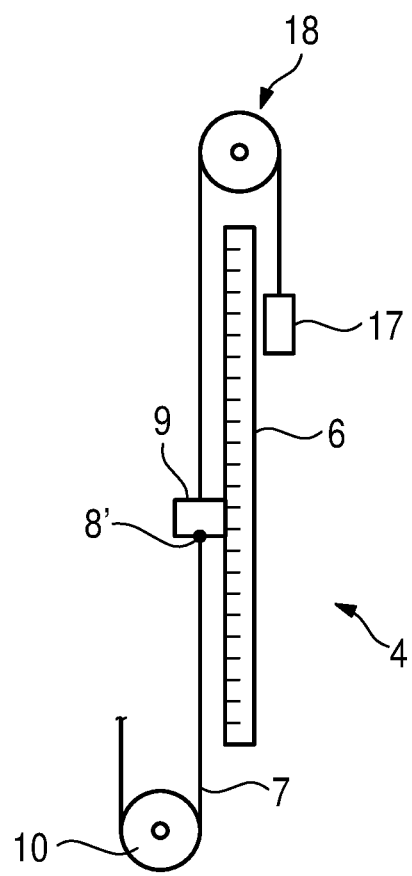

APPARATUS FOR MANUFACTURING THREE-DIMENSIONAL OBJECTS

CROSS-REFERENCE TO RELATED APPLICATIONS

This application claims priority to European Patent Application serial no. 17 182 637.3 filed Jul. 21, 2017, the contents of which are incorporated herein by reference in their entirety as if set forth verbatim.

DESCRIPTION

The invention relates to an apparatus for additively manufacturing of three-dimensional objects by means of successive layerwise selective irradiation and consolidation of layers of a build material which can be consolidated by means of an energy beam.

Apparatuses of that kind are well-known from prior art, wherein a build material is successively layerwise and selectively irradiated by an energy beam. The build material is typically carried by a carrying unit comprising a carrying element, in particular a build plate that is, for example, assigned to a build module of the apparatus. The build material is placed on the carrying element inside a build chamber of the build module, wherein the carrying element is movable to allow for a layerwise irradiation of the build material.

In other words, the build material is arranged on top of the build plate, wherein a build material can be selectively irradiated, wherein after a layer is irradiated a layer of fresh build material is conveyed on top of the layer, wherein the carrying element, in particular the build plate, is moved downwards so that the freshly applied layer of build material is again in the focal plane of the energy beam.

Therefore, it is necessary to determine the position and/or a travel distance of the movable component, in particular the build plate, to assure that the build plane in which the energy beam irradiates the build material, lies in a defined plane or a defined position, respectively. Thus, the movable component has to be exactly positioned to minimize positioning errors that lead to deviations in the orientation and/or the positioning of the build plane and consequently to imperfections in the three-dimensional objects built throughout the process.

Thus, it is an object to the present invention to provide an apparatus for additively manufacturing of three-dimensional objects, wherein the determination of a position and/or a travel distance of the moveable component is improved.

The object is inventively achieved by an apparatus according to the claims. Preferred embodiments are subject to the dependent claims.

The invention is based on the idea to provide a direct measuring unit for determining a position and/or a travel distance of at least one moveable component of the apparatus. The direct measuring unit allows for an exact determination or measurement, respectively, of the position and/or the travel distance of the moveable component.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

According to a preferred embodiment a coupling means is provided with at least one coupling means configured to couple the direct measuring unit with the component. Thus, the coupling means is disposed between the movable component of the apparatus and the direct measuring unit, wherein the coupling means comprises a first coupling point located at the component and a second coupling point located at the direct measuring unit, in particular a direct measuring means assigned to the direct measuring unit. Hence, the direct measuring unit is not a connected directly to the movable component but the direct measuring unit is coupled to the movable component via the coupling means of the coupling means.

Therefore, the direct measuring unit, in particular the direct measuring means, does not have to be connected directly to the movable component. This allows for an arbitrary arrangement of the direct measuring unit relative to the movable component so that it is not necessary to provide a specific space for the direct measuring unit in the movement direction of the movable component. In other words the movement of the movable component is transferred to a movement of the direct measuring unit, in particular the direct measuring means, via the coupling means coupling the direct measuring unit with the movable component.

Therefore, the provision of sufficient space for the movement of the direct measuring means connected to the movable component can be avoided. This leads to an increase in the overall dimensions of the apparatus. Besides, the use of laser interferometry is known, but the effort for chasing and maintaining such measurement means are high compared to direct measuring means, such as glass scales.

It is particularly preferred that the coupling means comprises a redirection means configured to redirect the movement of the movable component directed along the first movement direction and/or a first axis into a movement of the direct measuring means along a second movement direction and/or a second axis. According to this embodiment of the apparatus the movable component is movable along a first movement direction and/or a first axis, for example, the movable component can be moved in a vertical direction inside a build chamber of the apparatus. The direct measuring means of the direct measuring unit is movable along a second movement direction and/or a second axis. The first and the second movement direction and/or the first and the second axis can be arranged in parallel or perpendicular or under a predefined angle to each other.

Thus, it is possible, to arrange the direct measuring means in an arbitrary direction and/or along an arbitrary axis with respect to the movement direction of the movable component. In particular, the direct measuring means can be arranged in parallel to the movement direction of the movable component, wherein the direct measuring means is located spatially shifted to the movement direction and/or outside a movement area of the movable component. Further, the direct measuring means may be arranged essentially perpendicular to the movement direction of the movable component so that the direct measuring means can be located in an arbitrary position inside the apparatus. In particular, the direct measuring means can be located beneath the movable component without the requirement to hold a specific space available for the movement of the direct measuring means in the movement direction and/or a movement area of the movable component.

According to a preferred embodiment of the apparatus at least one coupling means is a pulling means and/or a pushing means. A pulling means in the course of this application is a means configured to transfer a pulling force between two objects, in particular from the movable component to the direct measuring means, and vice versa. Accordingly, a pushing means is a means configured to transfer a pushing force between two objects, in particular between the movable component and the direct measuring means, and vice versa. Self-evidently, the at least one coupling means can be configured to act as a pulling means and a pushing means in the same time by being configured to transfer pulling forces and pushing forces between the two objects.

According to another preferred embodiment of the apparatus at least one coupling means is built of or comprises a flexible material and/or low elongation material. It is particularly preferred that the coupling means is sufficiently flexible to redirect the direction of movement of the movable component to the direction of movement of the direct measuring means, wherein the coupling means is built of and/or comprises a flexible material in that a deflection of the coupling means is possible to allow for the redirection of the movement directions. The flexibility of the material can be a material immanent feature, for example in specific synthetic materials that allow for a flexibility and deformability of the coupling means and therefore, a deflection of the coupling means to redirect the movement directions. Further, the flexibility can result from the construction, i.e. the design, and/or the shape of the coupling means, for example by being built from a number of links and/or members that are movable relative to each other like for example in a chain.

Alternatively or additionally, the coupling means is built of or comprises low elongation material to allow for a direct transfer of a movement of the movable component into a movement of the direct measuring means. According to this embodiment it has been recognized that an elongation of the coupling means is disadvantageous for the transfer of the movement of the movable component to a movement of the direct measuring means. Although, it is possible, to take an elongation of the coupling means resulting from the transfer of the pushing and/or pulling force into calculation, it is preferred to use a low elongation material to assure a direct transfer of the movement of the movable component to a movement of the direct measuring means. Such low elongation material can for example be or comprise a metal and/or synthetic material that shows only low tensile elongation (or deformation in general) under typical forces resulting from the transfer of movement of the movable component to the direct measuring means.

It is therefore, particularly preferred to use a coupling means that is flexible enough to perform an adequate deflection and only show low elongation when being loaded in pushing and/or pulling direction, wherein the pushing and/or pulling direction as the direction of the coupling means is extended.

The apparatus can further be improved in that at least one coupling means is or comprises a rope and/or a wire and/or a chain and/or a rod and/or a spring and/or a pneumatic element and/or a hydraulic element. With the coupling means being built as or comprising a rope and/or a wire and/or a chain the coupling means can be deflected to redirect the movement of the movable component into a movement of the direct measuring means, wherein it also can be assured that the coupling means shows low (tensile) elongation so that the transfer of a movement is not distorted or influenced by an elongation of the coupling means. Besides or additionally, it is possible to provide a coupling means being built as or comprising a pneumatic element and/or a hydraulic element, wherein the parameters mentioned above can be regulated via a pneumatic or hydraulic pressure in that the elongation behavior, i.e. the response of the coupling element to a pushing and/or pulling force can be adjusted.

According to another preferred embodiment of the apparatus the redirection means is built as a redirection roll guiding and/or redirecting the coupling means. Thus, the redirection means is configured to deflect the coupling means having one fixation point or coupling point, respectively, located at the movable component and one fixation point or coupling point, respectively, located at the direct measuring unit, in particular located at the direct measuring means. The coupling means is deflected via the redirection roll between the two fixation or coupling points in that the movement direction of the movable component is redirected into the movement direction of the direct measuring unit. For example, the movement direction of the movable component is a vertical movement or a movement along a vertical axis, respectively. The movement direction of the direct measuring unit can lie in any arbitrary direction, wherein the coupling means extends from the movable component to the direct measuring unit and is deflected via the redirection means, in particular the redirection roll. Self-evidently the direct measuring means as wells as a measuring device such as a slide element assigned to the direct measuring means can be moved. The coupling means is correspondingly fixated via the fixation point to the direct measuring means or the slide element. Thereby, the slide element may carry a light source or a photo diode for an optical measurement system of the direct measuring unit that interacts with the direct measuring means.

Further, the coupling means is preferably preloaded. By providing a preload on the coupling means it can be assured that the coupling means is pulled taut, being configured to transfer the movement unfalsified. Additionally, it can be assured that especially when using a pulling means as coupling means a redirection of movements is possible in both movement directions, in particular by moving the movable component upwards or downwards.

The described embodiment can further be improved in that the coupling means is preloaded via a spring and/or a pneumatic pressure and/or a hydraulic pressure and/or a supplementary weight. Therefore, a preload can be applied to the coupling means by a spring force and/or a pneumatic pressure and/or a hydraulic pressure and/or a supplementary weight fixed directly or indirectly to the coupling means. Self-evidently the preload is adjustable and depends on the specific application. Further, in particular regarding the pneumatic pressure and/or the hydraulic pressure a regulation of the preload is feasible. Of course, it is also feasible to regulate the preload applied by a spring force and/or a supplementary weight.

Another preferred improvement of the apparatus suggests that the direct measuring unit comprises at least one direct measuring means extending in a direction and/or along an axis different from a movement direction of the component. Thus, the arrangement of the direct measuring means can be chosen independently of the movable component, in particular the moving direction or a moving area of the movable component. This allows for a nearly unlimited freedom of arrangements of the direct measuring means, in particular arranging the direct measuring means in a space-saving manner is feasible. Therefore, the overall size of the apparatus can be reduced as available space inside the apparatus can be used to arrange the direct measuring means independent of the location of the direct measuring means with respect to the movable component. In other words the direct measuring means can be arranged in an arbitrary location of the apparatus, wherein the movement of the movable component is transferred to the direct measuring means via the coupling means.

The apparatus can further be improved in that the movable component is driven or drivable via at least one telescopic spindle. By using a telescopic spindle to drive or move the movable component it is possible, to save space beneath or adjacent to the movable component, as there is no need to hold available space for the spindle in its maximum elongation but the spindle can be telescoped to a minimum elongation, for example when the movable component is in a minimum position and to telescope the spindle to a maximum elongation, for example when the movable component is in a maximum position.

Advantageously, the direct measuring unit, i.e. the direct measuring means does not have to be located beneath the movable component and does not have to be directly connected to the movable component so that the space for moving the direct measuring means does not have to be held available beneath the movable component. Instead, the direct measuring means can be located in an arbitrary other place inside the apparatus to allow for a telescopic movement of the spindle and for a space optimized arrangement.

The apparatus can further be improved by providing at least one sensor configured to determine at least one ambient parameter, in particular the temperature and/or the humidity, wherein a control unit is configured to control the preload of the coupling means dependent on the determined ambient parameter. Hence, the influence of the ambient parameters on the movement and/or the elongation behavior of the coupling means can be taken into calculation. The preload of the coupling means can therefore, be adjusted adequately depending on the determined or measured ambient parameter, in particular the temperature and/or the humidity.

It is particularly preferred, that the direct measuring unit is or comprises an optical measuring unit. Therefore, the direct measuring means can be built as or comprise a glass scale, wherein a travel and/or a movement of the glass scale is recorded via an adequate optical measuring unit, such as a light source and photodetector couple, for example counting a respective measure provided on the glass scale. Alternatively, it is also possible, to use a measuring belt, in particular a magnetic measuring belt as measuring means.

Preferably, the movable component of the apparatus is a component of a carrying unit, for example a carrying element, in particular a build plate carrying build material and/or the object built or being built during the manufacturing process.

Exemplary embodiments of the invention are described with reference to the Fig. The Fig. are schematic drawings, wherein FIG. 1 shows a principle drawing of an apparatus for additively manufacturing three-dimensional objects according to a first exemplary embodiment;

FIG. 6 shows a principle drawing of a part of an apparatus for additively manufacturing three-dimensional objects according to a sixth exemplary embodiment.

Figure 1:
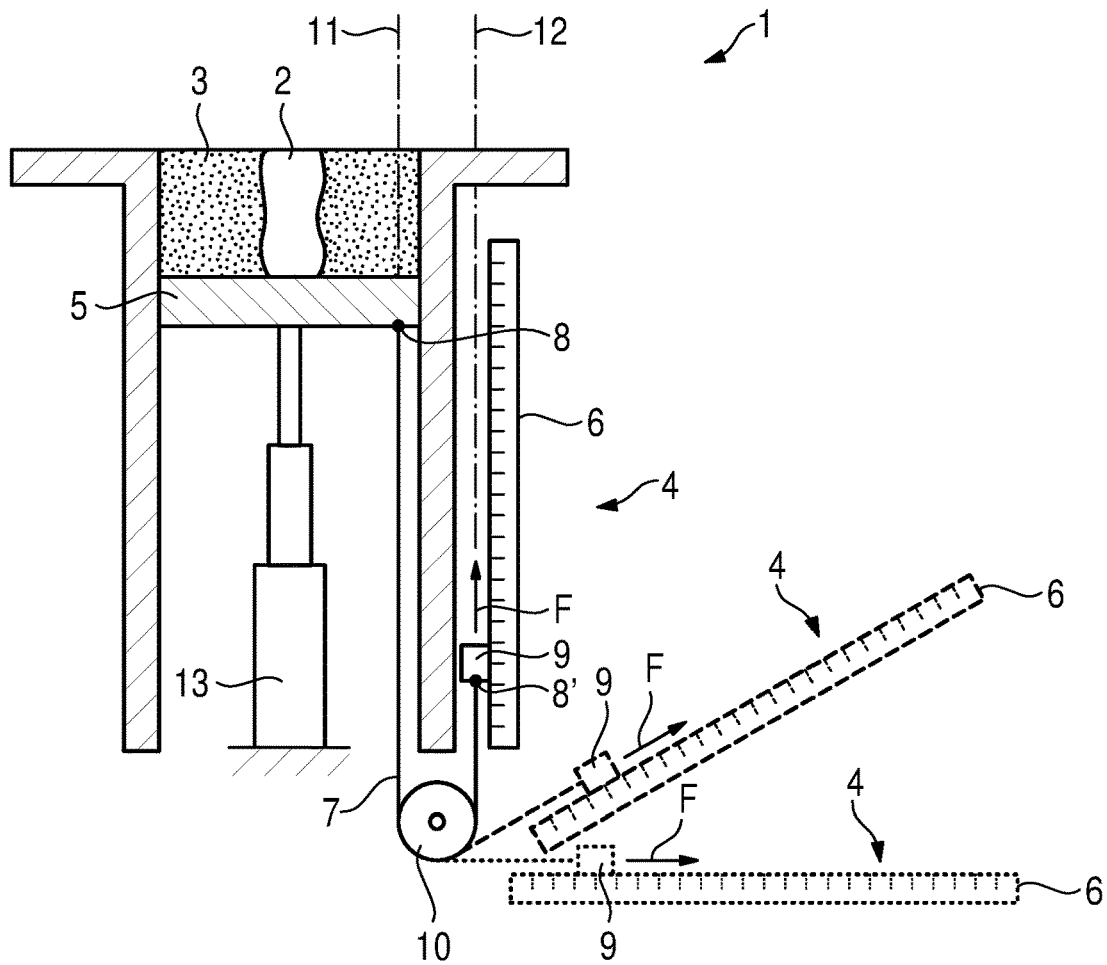

FIG. 1 shows an apparatus 1 for additively manufacturing of three-dimensional objects 2 by means of successive layerwise selective irradiation and consolidation of layers of a build material 3 which can be consolidated by means of an energy beam, wherein a direct measuring unit 4 is provided for determining a position and/or a travel distance of at least one movable component 5 of the apparatus 1. According to this embodiment, the movable component 5 is a carrying element, in particular a build plate. The direct measuring unit 4 comprises a direct measuring means 6, for example a glass scale.

FIG. 1 further shows that the movable component 5 and the direct measuring unit 4 are coupled via a coupling means 7, for example a rope or a chain or a wire. The coupling means 7 is attached to the movable component 5 via a first a fixation point 8 and the coupling means 7 is also attached to a slide element 9 via a second fixation point 8' which slide element 9 is part of the direct measuring unit 4, in particular sliding alongside the direct measuring means 6 corresponding to a movement of the movable component 5 transferred to the slide element 9 via the coupling means 7.

The coupling means 7 is deflected or redirected via a redirection means 10 that is built as a redirection roll. The coupling means 7 therefore, extends essentially vertically from the first fixation point 8 along a first axis 11 and is redirected or deflected, respectively, via the redirection means 10 into the movement direction of the slide element 9 essentially along an axis 12. Therefore, a movement of the movable component 5 is transferred via the coupling means 7 into a movement of the slide element 9, i.e. a movement of (a part of) the direct measuring unit 4. In other words the movement of the slide element 9 relative to the direct measuring means 6 allows for a determination of a travel distance of the movable component 5.

The direct measuring unit 4 can therefore, comprise a light source and a corresponding photodetector to enable the determination of the position and/or the travel of the slide element 9 along the direct measuring means 6, in particular a glass scale. The movable component 5 is driven by a telescopic spindle 13 configured to drive the movable component 5 essentially along the axis 11, wherein the telescopic spindle 13 is telescoped dependent on the position of the movable component 5. The setup depicted in FIG. 1 allows for a compact arrangement of the apparatus 1 as the direct measuring unit 4 does not have to be directly connected to the movable component 5, for example in connecting the direct measuring means 6 directly beneath the movable component 5. Instead, the direct measuring means 6 can be arranged in parallel and outside the space required for moving the movable component 5.

The coupling means 7 is built of a flexible material with low elongation, for example a metal wire, in particular a Bowden-wire and acts essentially as a pulling means, wherein the slide element 9 is pulled along the axis 12, when the movable component 5 is moved along the axis 11.

As can further be derived from FIG. 1 the direct measuring means 6, i.e. the glass scale can be arranged in any arbitrary angle and/or arrangement relative to the axis 12, in particular the direct measuring means 6 can be arranged perpendicular to the axis 12 or perpendicular to the movement direction of the movable component 5. Therefore, the direct measuring unit 4 comprises a direct measuring means 6, i.e. the glass scale that extends in a direction different from a movement direction of the movable component 5.

Figure 2:
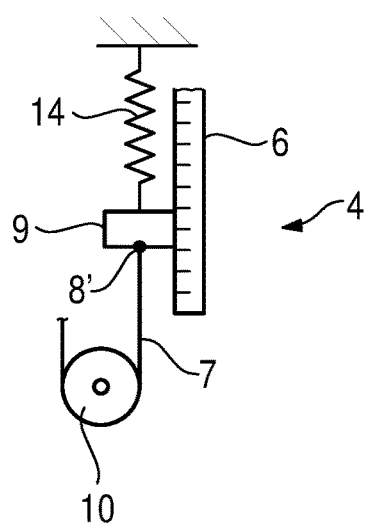
FIG. 2 shows a principle drawing of a part of an apparatus for additively manufacturing three-dimensional objects according to a second exemplary embodiment.

FIG. 2 shows a part of an apparatus 1 according to a second exemplary embodiment, wherein the direct measuring unit 4 is preloaded via a spring 14. The spring 14 is connected to the slide element 9 and provides a pulling force on the slide element 9 that tightens the coupling means 7. By way of the preload via the spring 14 it is assured that the slide element 9 is moved relative to the direct measuring means 6 correspondent to the movement of the movable component 5 in both vertical upward and downward direction.

Figure 3:
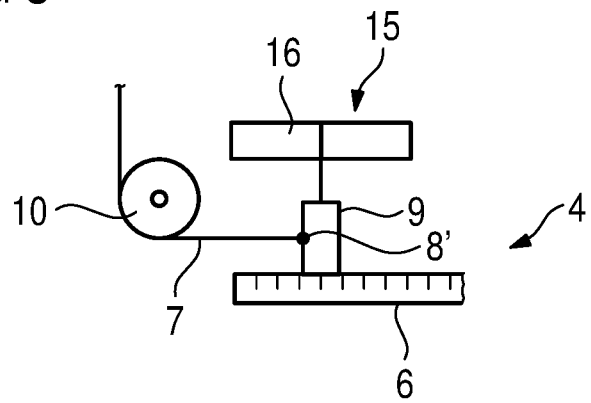
FIG. 3 shows a principle drawing of a part of an apparatus for additively manufacturing three-dimensional objects according to a third exemplary embodiment.

FIG. 3 shows a part of the apparatus 1 according to a third exemplary embodiment. According to the third embodiment the direct measuring unit 4 also comprises a direct measuring means 6 and a slide element 9 that is movable relative to the direct measuring means 6. Also a coupling element 7 is deflected via a redirection means 10 and is fixated to the slide element 9. Further, FIG. 3 shows a pneumatic element 15 that is connected to the slide element 9, wherein a pneumatic pressure can be applied in a first chamber 16, preferably controlled by a control unit. The preload applied on the slide element 9 is adjustable via the pneumatic pressure in the chamber 16, wherein the pressure may be varied according to a determined ambient parameter.

Figure 4:
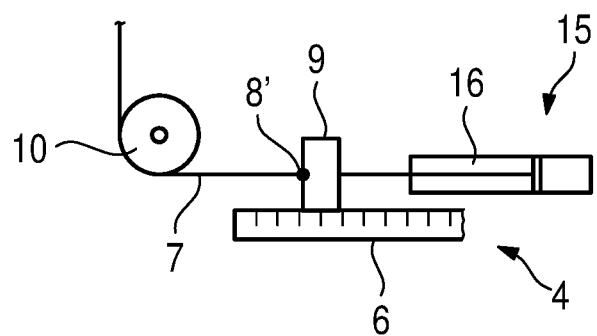
FIG. 4 shows a principle drawing of a part of an apparatus for additively manufacturing three-dimensional objects according to a fourth exemplary embodiment.

FIG. 4 shows a part of an apparatus 1 according to a fourth embodiment. Deviant from the third embodiment shown in FIG. 3 the pneumatic element 15 is arranged in parallel to the direct measuring means 6, i.e. in line with the coupling element 7. The pneumatic element 15 is connected to the slide element 9 just like the pneumatic element 15 shown in FIG. 3. By applying a defined pressure inside the chamber 16 a preload force is adjustable on the slide element 9 and transferable via the slide element 9 on the coupling means 7 to tighten the coupling means 7.

Figure 5:
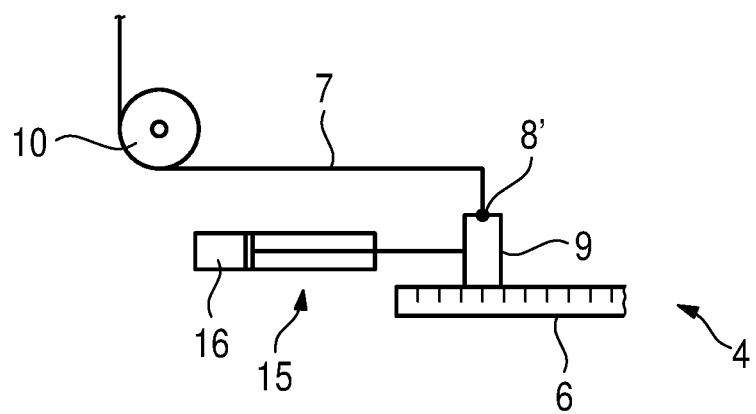
FIG. 5 shows a principle drawing of a part of an apparatus for additively manufacturing three-dimensional objects according to a fifth exemplary embodiment.

FIG. 5 shows a part of an apparatus 1 according to a fifth embodiment, wherein also a pneumatic element 15 is used to generate a preload on the slide element 9. The fifth embodiment depicts another alternative in the arrangement of the pneumatic element 15, wherein the pneumatic element 15 is arranged on the side of the coupling means 7. Analogously, a preload can be applied on the slide element 9 by setting a defined pressure in the chamber 16 assuring a direct transfer of the movement of the movable component 5 to a movement of the slide element 9 and therefore a movement of the direct measuring unit 4.

FIG. 6 shows a part of the apparatus 1 according to a sixth exemplary embodiment of the invention. In the sixth exemplary embodiment a preload is generated by a supplementary weight 17 that is coupled to the slide element 9 via a pulley unit 18. The weight force generated by the supplementary weight 17 results in a preload force on the slide element 9 tightening the coupling means 7 and assuring a direct transfer of a movement of the movable component 5 into a movement of the slide element 9 and therefore, a movement of the direct measuring unit 4.

In the embodiments depicted in the FIG. 3-5 also a hydraulic element can be used instead of the pneumatic element 15, wherein a hydraulic pressure can be set or adjusted to control the preload on the coupling elements 7. Self-evidently it does not matter throughout all embodiments shown, whether the slide element 9, for example carrying a light source and a photo diode, or the direct measuring means 6 is moved.

The invention claimed is:

1. An apparatus for additively manufacturing of three-dimensional objects by successive layerwise selective irradiation and consolidation of layers of a build material with an energy beam, comprising:
   a direct measuring unit configured for determining a position and/or a travel distance of at least one moveable component of the apparatus; and
   a coupling element configured to couple the direct measuring unit with the at least one moveable component, wherein the coupling element comprises a redirection element configured to redirect a movement of the at least one moveable component directed along a first movement direction and/or a first axis into a movement of the direct measuring unit along a second movement direction and/or a second axis.

2. The apparatus according to claim 1, wherein the coupling element is further configured to transfer a pushing and/or a pulling force.

3. The apparatus according to claim 1, wherein the coupling element comprises a flexible material and/or a low elongation material.

4. The apparatus according to claim 1, wherein the coupling element comprises a rope and/or a wire and/or a chain and/or a rod and/or a spring and/or a pneumatic element and/or a hydraulic element.

5. The apparatus according to claim 1, wherein the redirection element is arranged as a redirection roll guiding and/or redirecting the coupling element.

6. The apparatus according to claim 1, wherein the coupling element is preloaded.

7. The apparatus according to claim 6, wherein the coupling element is preloaded via a pneumatic pressure and/or a hydraulic pressure.

8. The apparatus according to claim 6, by further comprising:
   at least one sensor configured to determine at least one ambient parameter; and
   a control unit configured to control the preload of the coupling element dependent on the at least one determined ambient parameter.

9. The apparatus according to claim 8, wherein the ambient parameter comprises at least one of a temperature or a humidity.

10. The apparatus according to claim 6, wherein the coupling element is preloaded via a spring and/or a supplementary weight.

11. The apparatus according to claim 1 wherein the direct measuring unit comprises at least one direct measuring element extending in a direction and/or along an axis different from a movement direction of the at least one moveable component.

12. The apparatus according to claim 1, wherein the at least one moveable component is driven or drivable via at least one telescopic spindle.

13. The apparatus according to claim 1, wherein the direct measuring unit further comprises an optical measuring unit.

14. The apparatus according to claim 1, wherein the direct measuring unit further comprises a glass scale.

15. The apparatus according to claim 1, wherein the at least one moveable component is a component of a carrying unit.

16. The apparatus according to claim 15, wherein the at least one moveable component is a build plate.

17. The apparatus according to claim 1, wherein the coupling element is further configured to transfer a pushing and a pulling force.

* * * * *